US011572981B2

(12) United States Patent
Comstock

(10) Patent No.: US 11,572,981 B2
(45) Date of Patent: Feb. 7, 2023

(54) NON-FRANGIBLE LOAD RELEASE ASSEMBLY

(71) Applicant: Insitu, Inc., a subsidiary of The Boeing Company, Bingen, WA (US)

(72) Inventor: Kelly Axel Comstock, Carson, WA (US)

(73) Assignee: The Boeing Company, Chicago, IL (US)

( * ) Notice: Subject to any disclaimer, the term of this patent is extended or adjusted under 35 U.S.C. 154(b) by 324 days.

(21) Appl. No.: 16/893,313

(22) Filed: Jun. 4, 2020

(65) Prior Publication Data

US 2021/0381644 A1    Dec. 9, 2021

(51) Int. Cl.
| F16P 5/00 | (2006.01) |
| F16G 15/08 | (2006.01) |
| B66D 1/58 | (2006.01) |
| F16B 45/02 | (2006.01) |
| F16G 11/14 | (2006.01) |
| F16G 15/10 | (2006.01) |

(52) U.S. Cl.
CPC .................. *F16P 5/00* (2013.01); *B66D 1/58* (2013.01); *F16B 45/02* (2013.01); *F16G 11/14* (2013.01); *F16G 15/08* (2013.01); *F16G 15/10* (2013.01)

(58) Field of Classification Search
CPC .... F16P 5/00; B66D 1/58; F16B 45/02; F16B 45/022; F16B 45/027; F16B 45/021; F16B 45/047; F16G 11/14; F16G 15/08; F16G 15/10; F16G 15/06; B66C 1/38
See application file for complete search history.

(56) References Cited

U.S. PATENT DOCUMENTS

| 3,850,468 A | 11/1974 | Hultin | |
| 4,279,062 A * | 7/1981 | Boissonnet | F16B 45/021 24/601.5 |
| 4,401,333 A * | 8/1983 | Merry | F16B 45/02 D8/382 |
| 4,632,443 A * | 12/1986 | Miller | B66C 1/36 294/82.11 |
| 4,687,365 A | 8/1987 | Promersberger | |
| 5,054,416 A * | 10/1991 | Zetah | B63B 21/46 114/304 |
| 2015/0345539 A1* | 12/2015 | Servais | F16B 45/021 24/599.1 |

* cited by examiner

*Primary Examiner* — David M Upchurch
(74) *Attorney, Agent, or Firm* — Yee & Associates, P.C.

(57) ABSTRACT

A non-frangible load release assembly having a pre-set tension for release is presented. The load release assembly comprises a snap shackle having a quick release and a link, a spring having a spring rate, and an actuating line with a length selected based on the spring rate to provide the pre-set tension for the load release assembly. The spring is attached to the link of the snap shackle. The actuating line is connected to the quick release of the snap shackle.

21 Claims, 14 Drawing Sheets

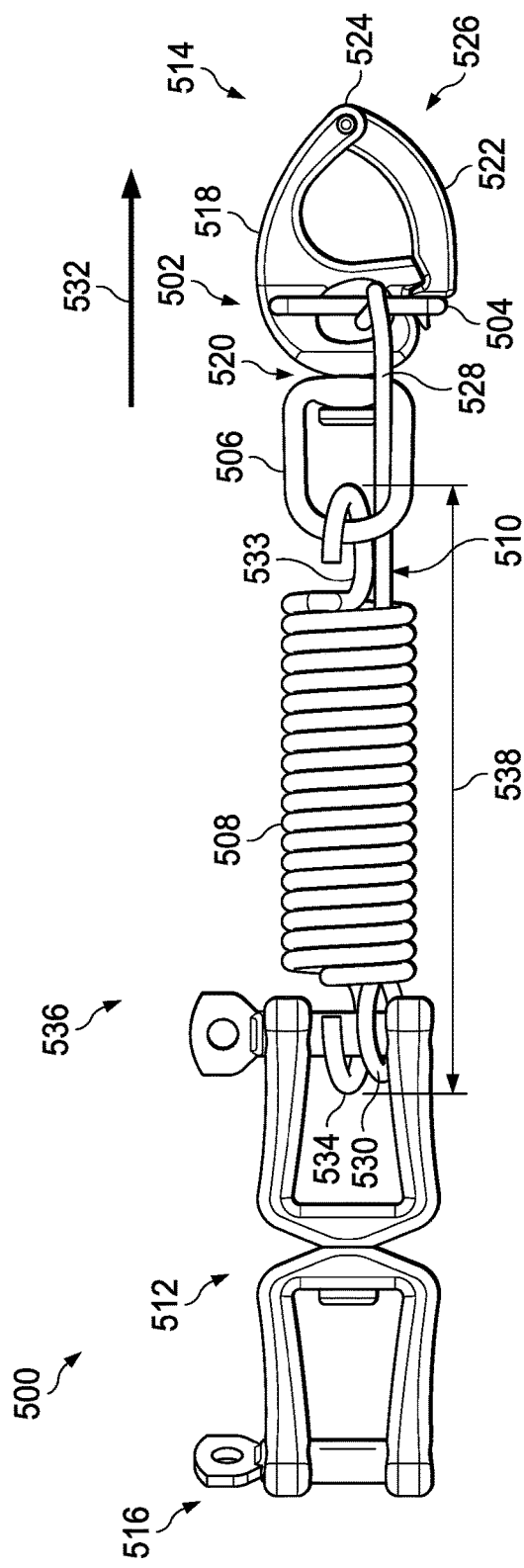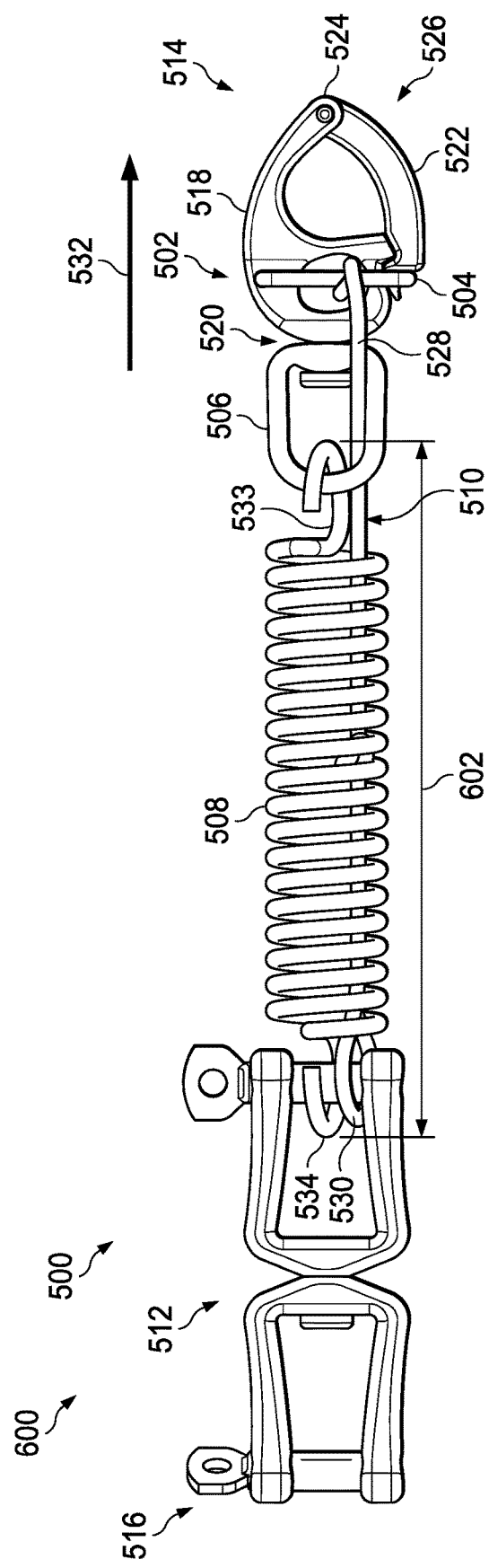

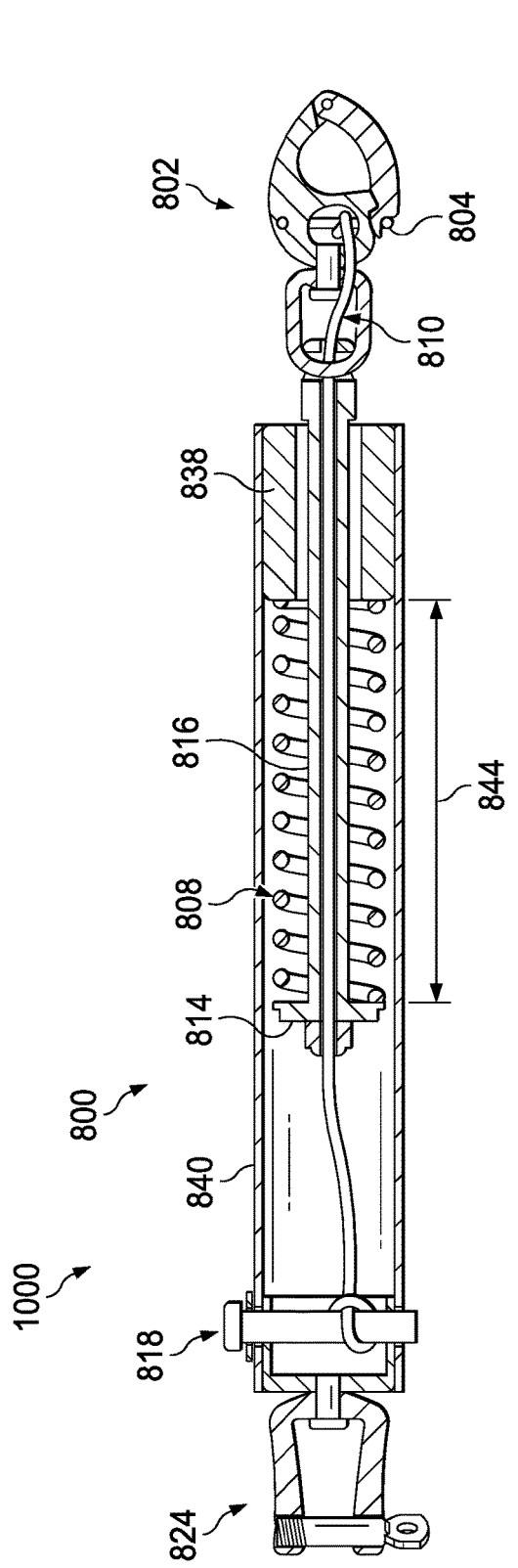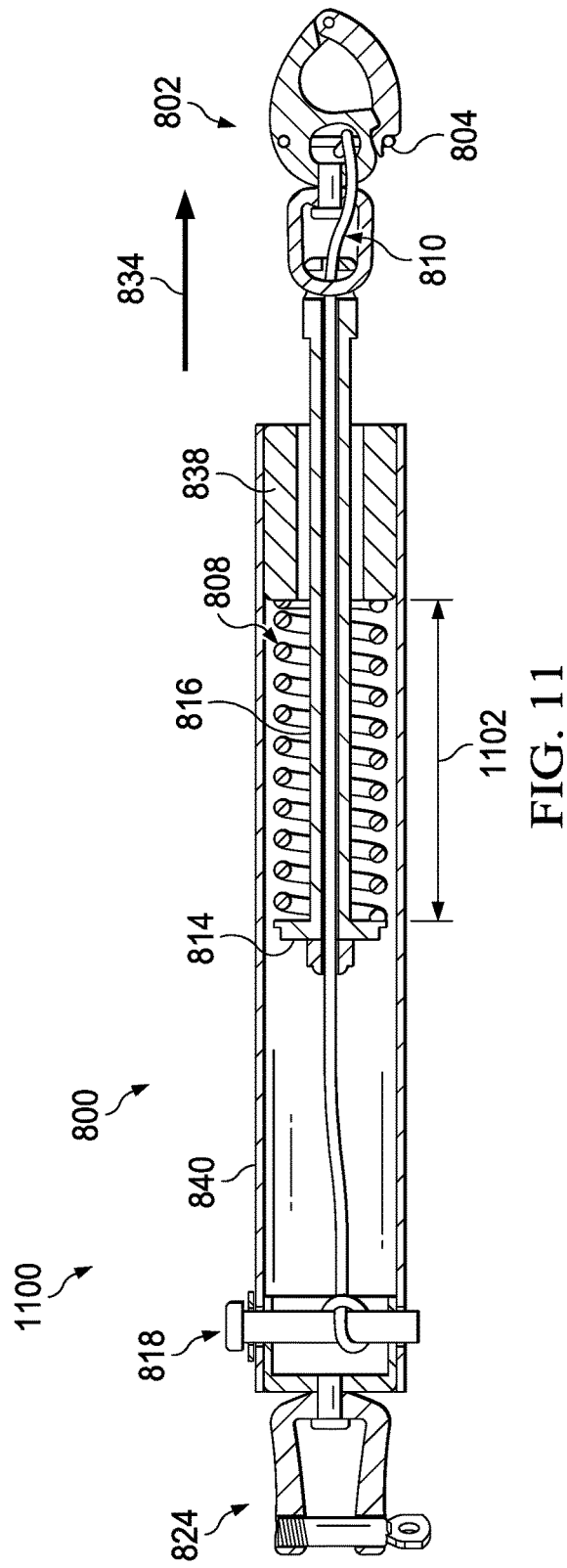

NON-FRANGIBLE LOAD RELEASE ASSEMBLY

BACKGROUND INFORMATION

1. Field

The present disclosure relates generally to an assembly to release loads and, more particularly, to a non-frangible assembly and method for releasing loads.

2. Background

In several different fields it is desirable to release an object at a pre-determined load. Releasing an object at a predetermined load may be desirable for operational or safety reasons. Conventional load release assemblies are frangible, breaking at least one component of the assembly. When a conventional frangible load release assembly breaks, a portion of the load release assembly remains connected to the object. The overall weight of the object is increased by the portion of the load release assembly attached to the object.

Therefore, it would be desirable to have a method and apparatus that takes into account at least some of the issues discussed above, as well as other possible issues.

SUMMARY

An example of the present disclosure provides a non-frangible load release assembly having a pre-set tension for release. The load release assembly comprises a snap shackle having a quick release and a link, a spring having a spring rate, and an actuating line with a length selected based on the spring rate to provide the pre-set tension for the load release assembly. The spring is attached to the link of the snap shackle. The actuating line is connected to the quick release of the snap shackle.

Another example of the present disclosure provides a method of assembling a non-frangible load release assembly having a pre-set tension for release. A spring with a spring rate is attached to a link of a snap shackle. A length for an actuating line is selected based on the spring rate to provide the pre-set tension for the load release assembly. The actuating line with the length is connected to a quick release of the snap shackle.

Yet another example of the present disclosure provides a method of releasing an object at a pre-set load value. A snap shackle of a first end of a non-frangible load release assembly is connected to the object. A connector of a second end of the non-frangible load release assembly is connected to an anchor. A quick release of the snap shackle is triggered by a actuating line of the load release assembly when a load applied by the object meets the pre-set load value, the actuating line having a length selected based on a spring rate of a spring of the load release assembly to provide a pre-set tension for the load release assembly.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

FIG. 5 is an illustration of a non-frangible load release assembly with a load applied in accordance with an illustrative example;

FIG. 6 is an illustration of a non-frangible load release assembly with a load applied in accordance with an illustrative example;

FIG. 10 is an illustration of a cross-sectional view of a non-frangible load release assembly with a load applied in accordance with an illustrative example;

FIG. 11 is an illustration of a cross-sectional view of a non-frangible load release assembly with a load applied in accordance with an illustrative example;

DETAILED DESCRIPTION

The illustrative examples recognize and take into account one or more different considerations. The illustrative examples recognize and take into account that frangible load release assemblies may also be referred to as breakaway connectors. The illustrative examples recognize and take into account that breakaway connectors require replacement pins or wires that go in strength intervals. The illustrative examples recognize and take into account that breakaway connectors may not be reused in some circumstances. The illustrative examples recognize and take into account that in circumstances in which breakaway connectors can be reused, the breakaway connectors will use another breakaway pin or other replaceable component prior to a subsequent use.

The illustrative examples recognize and take into account that with breakaway connectors, half of the connector would still be attached to the object providing the load. The illustrative examples recognize and take into account that additional weight is often undesirable.

The illustrative examples recognize and take into account that some other load release systems have considerable range of release that results in a lack of reliability. The illustrative examples recognize and take into account that it is desirable to provide a distinct and repeatable load value for release.

The illustrative examples provide a non-frangible load release assembly. The non-frangible load release assembly is set to release an object at a desired pre-determined load. The illustrative examples use a hinged bail, such as a snap shackle, that is actuated when a spring is extended or compressed to a pre-set length. When the spring is extended or compressed to a pre-set length, an actuating line triggers the hinged bail to releases the load completely.

The illustrative examples do not utilize frangible pins or wires. The load release provided by the illustrative examples is based on spring rate and the length of an actuating line. The load release assembly can be tuned by adjusting the length of the actuating line.

Figure 1:
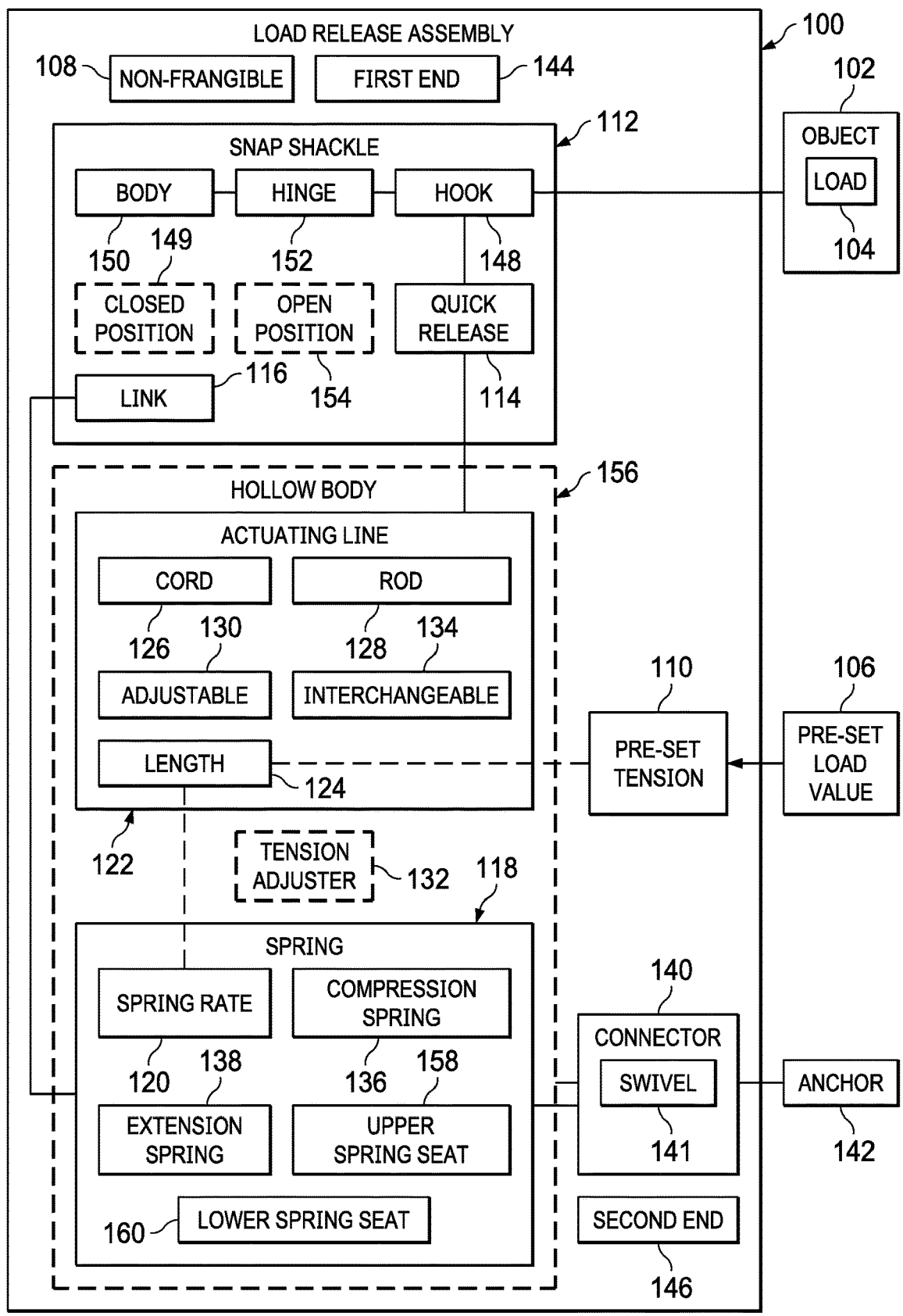
FIG. 1 is an illustration of a block diagram of a manufacturing environment in which an illustrative example may be implemented.

Turning now to FIG. 1, an illustration of a block diagram of a manufacturing environment in which an illustrative example may be implemented is depicted. Load release assembly 100 is configured to release object 102 when object 102 applies load 104 having at least pre-set load value 106. Non-frangible 108 load release assembly 100 has pre-set tension 110 for release. Pre-set tension 110 is set based on pre-set load value 106.

Non-frangible 108 load release assembly 100 comprises snap shackle 112 having quick release 114 and link 116, spring 118 having spring rate 120, and actuating line 122 with length 124 selected based on spring rate 120 to provide pre-set tension 110 for load release assembly 100. The spring rate 120 may be known, or the spring 118 may be selected for having a desired spring rate 120.

A spring rate is measurement of the constant amount of spring's force expressed in units of load per one unit of distance traveled. For example, the spring rate may be expressed as force per inch. Spring rate may also be referred to as a "spring constant."

Actuating line 122 is connected to quick release 114 of snap shackle 112. Spring 118 is attached to link 116 of snap shackle 112.

Quick release 114 of snap shackle 112 opens snap shackle when quick release 114 is actuated. Quick release 114 is actuated by actuating line 122 at pre-set tension 110.

Actuating line 122 takes any desirable form. Actuating line 122 is selected such that the length is not stretched by pre-set load value 106. Actuating line 122 can be a frame, a wire, cord 126, rod 128, or any other desirable type of actuating line. In some illustrative examples, actuating line 122 is rigid in all directions. In some illustrative examples, actuating line 122 is flexible in at least one direction. For example, when actuating line 122 takes the form of cord 126, cord 126 can have slack when object 102 is not applying load 104 with pre-set load value 106. Material of cord 126 is such that such that the length is not stretched by pre-set load value 106.

In some illustrative examples, length 124 of actuating line 122 is adjustable 130. When length 124 is adjustable 130, length 124 is maintained to maintain pre-set tension 110 unless adjusted. By changing length 124 of actuating line 122, pre-set tension 110 is changed. When length 124 of actuating line 122 is adjustable 130, actuating line 122 can be used for a variety of pre-set values of pre-set tension 110 of load release assembly 100.

When length 124 of actuating line 122 is adjustable 130, load release assembly 100 has tension adjuster 132. Tension adjuster 132 is configured to change length 124 of actuating line 122 to adjust pre-set tension 110. Tension adjuster 132 takes any desirable form. In some illustrative examples, tension adjuster 132 includes a knob that may be turned to shorten or lengthen actuating line 122. In some illustrative examples, tension adjuster 132 is a portion of actuating line 122 that can be modified. In one illustrative example, tension adjuster 132 is a knot and a loop in actuating line 122.

In some illustrative examples, actuating line 122 is interchangeable 134. When actuating line 122 is interchangeable 134, actuating line 122 can be removed and replaced with a different actuating line having a different length to change pre-set tension 110. In some illustrative examples, actuating line 122 is not adjustable 130, but is interchangeable 134 such that actuating line 122 is removed and replaced to change pre-set tension 110.

In some illustrative examples, actuating line 122 is both adjustable 130 and interchangeable 134. When actuating line 122 is adjustable 130, actuating line 122 has a range of possible lengths for length 124. In some illustrative examples, actuating line 122 is removed and replaced with a different actuating line with a different range of possible lengths. By removing and replacing adjustable 130 actuating line 122, pre-set tension 110 either higher than possible with actuating line 122 or lower than possible with actuating line 122.

Length 124 is selected based on pre-set load value 106 and spring rate 120. Using spring rate 120, a distance that spring 118 will move is determined for pre-set load value 106. Length 124 is selected such that actuating line 122 will be placed into tension when pre-set load value 106 is applied to load release assembly 100. When actuating line 122 is placed into tension, actuating line 122 actuates quick release 114 to open snap shackle 112.

Spring 118 takes any desirable form in which spring 118 has a substantially constant spring rate 120. In some illustrative examples, spring 118 takes the form of compression spring 136. When spring 118 takes the form of compression spring 136, pre-set load value 106 compresses spring 118. When spring 118 takes the form of extension spring 138, pre-set load value 106 extends spring 118.

Load release assembly 100 also includes connector 140 configured to connect load release assembly 100 to anchor 142. Actuating line 122 and spring 118 are joined to connector 140. Actuating line 122 and spring 118 can be either directly or indirectly joined to connector 140.

As used herein, a first component "joined to" a second component means that the first component can be connected directly or indirectly to the second component. In other words, additional components may be present between the first component and the second component. The first component is considered to be indirectly joined to the second component when one or more additional components are present between the two components. When the first component is directly joined to the second component, no additional components are present between the two components.

In some illustrative examples, connector 140 includes swivel 141. Swivel 141 allows for rotation of components of load release assembly 100 relative to anchor 142.

Snap shackle 112 is first end 144 of load release assembly 100 and connector 140 is second end 146 of load release assembly 100. First end 144 of load release assembly 100 is connected to object 102. Second end 146 of load release assembly 100 is connected to object 102.

Object 102 is connected to first end 144 of load release assembly 100 by placing hook 148 of snap shackle 112 into closed position 149. Hook 148 of snap shackle 112 is pivotally connected to body 150 of snap shackle 112 by hinge 152. Quick release 114 is configured to engage with hook 148 to hold hook 148 in closed position 149. When actuated, quick release 114 no longer engages hook 148. When quick release 114 is actuated, hook 148 is placed in open position 154. When hook 148 is placed in open position 154, load release assembly 100 releases object 102.

Actuating line 122 is connected to quick release 114. Actuating line 122 is connected to another component of load release assembly 100 that does not move due to load 104 applied to load release assembly 100. In some illustrative examples, actuating line 122 is directly connected to connector 140. In some illustrative examples, actuating line 122 is connected to tension adjuster 132. In some illustrative examples, actuating line 122 is connected to hollow body 156 of load release assembly 100.

Spring 118 is connected to components of load release assembly 100 in any desirable way. In some illustrative examples, spring 118 is directly connected to link 116 of snap shackle 112. In some illustrative examples, spring 118 is directly connected to snap shackle 112 and connector 140. In these illustrative examples, spring 118 takes the form of extension spring 138.

In some illustrative examples, hollow body 156 surrounds spring 118. In these illustrative examples, hollow body 156 is between connector 140 and snap shackle 112. Hollow body 156 can provide rigidity to load release assembly 100. In some illustrative examples, actuating line 122 and spring 118 are indirectly joined to connector 140 through hollow body 156.

In some illustrative examples, spring 118 is indirectly connected to snap shackle 112 and connector 140. In some illustrative examples, spring 118 is compression spring 136 with upper spring seat 158 and lower spring seat 160. In some illustrative examples, upper spring seat 158 is affixed to hollow body 156 restraining upper spring seat 158 relative to connector 140. In these illustrative examples, spring 118 is indirectly joined to connector 140 by upper spring seat 158 and hollow body 156.

Actuating line 122 extends along a portion of the length of load release assembly 100. In some illustrative examples, actuating line 122 extends through spring 118. In some illustrative examples, actuating line 122 is outside of spring 118.

The illustrations of load release assembly 100 in FIG. 1 are not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, snap shackle 112 make take the form of any desirable type of hinged bail or actuated latch. As another example, hollow body 156 is optional and is not present in some illustrative examples.

Figure 2:
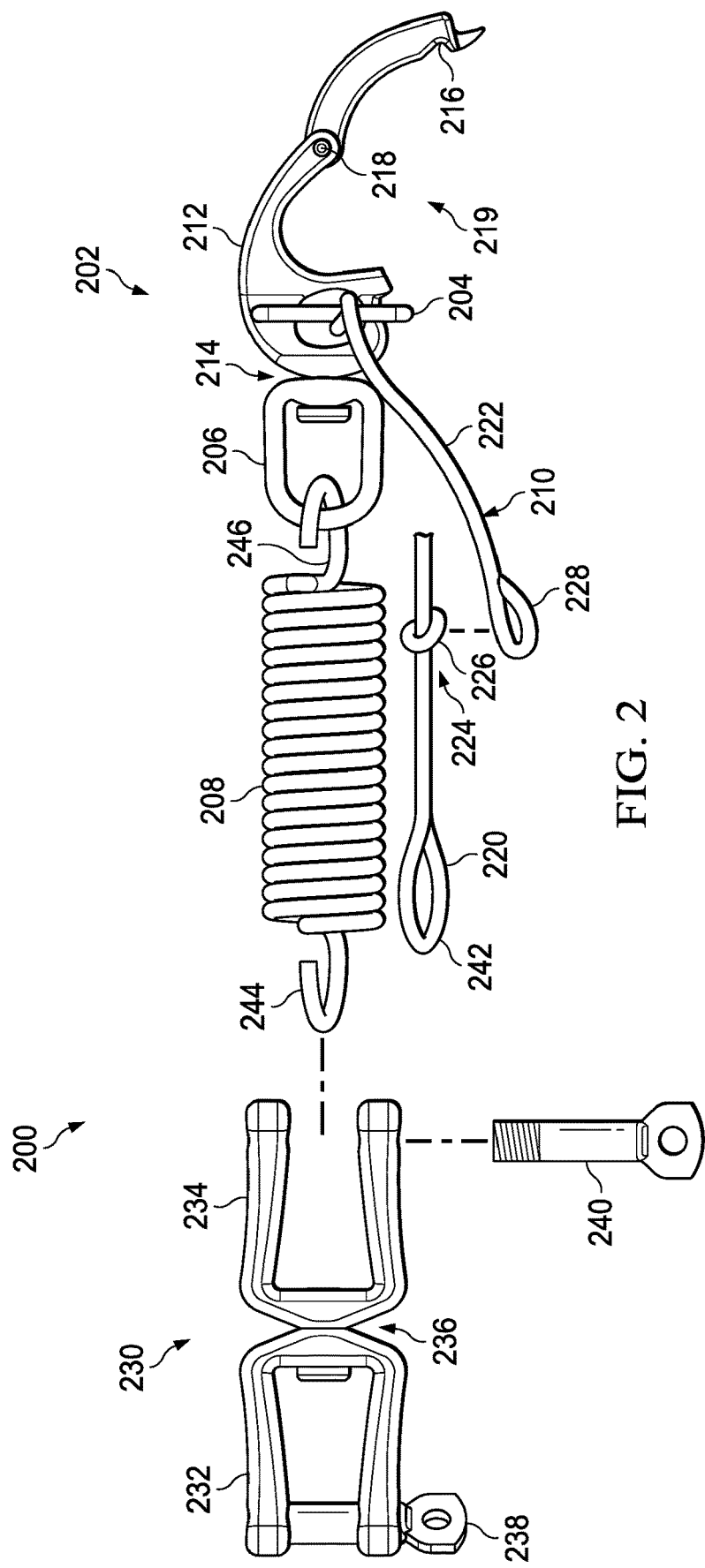
FIG. 2 is an illustration of exploded view of a non-frangible load release assembly in accordance with an illustrative example.

Turning now to FIG. 2, an illustration of exploded view of a non-frangible load release assembly is depicted in accordance with an illustrative example. Load release assembly 200 is a physical implementation of load release assembly 100 of FIG. 1. Load release assembly is non-frangible and has a pre-set tension for release.

Load release assembly 200 comprises snap shackle 202 having quick release 204 and link 206, spring 208 having a spring rate, and actuating line 210 with a length selected based on the spring rate to provide the pre-set tension for load release assembly 200. Spring 208 is attached to link 206 of snap shackle 202. Actuating line 210 is connected to quick release 204 of snap shackle 202.

Snap shackle 202 has body 212 connected to link 206 by swivel 214. Hook 216 of snap shackle 202 is pivotally connected to body 212 by hinge 218. Quick release 204 is configured to engage with hook 216 to hold hook 216 in a closed position. As depicted, hook 216 is in open position 219.

As depicted, actuating line 210 includes first portion 220 and second portion 222. First portion 220 has tension adjuster 224. As depicted, tension adjuster 224 includes knot 226 of first portion 220 and loop 228 of second portion 222. By adjusting a position of knot 226 in first portion 220, a length of actuating line 210 is adjusted. Adjusting the length of actuating line 210 changes the pre-set tension for load release assembly 200.

Load release assembly 200 also includes connector 230. As depicted, connector 230 includes link 232 and link 234 joined by swivel 236. Connector 230 is configured to connect load release assembly 200 to an anchor, such as the ground. Link 232 is opened by removing pin 238. As depicted, pin 240 has been removed from link 234 to open link 234.

To assemble load release assembly 200, pin 240 is sent through loop 242 of actuating line 210 and second end 244 of spring 208. First end 246 of spring 208 is connected to link 206 of snap shackle 202.

Figure 3:
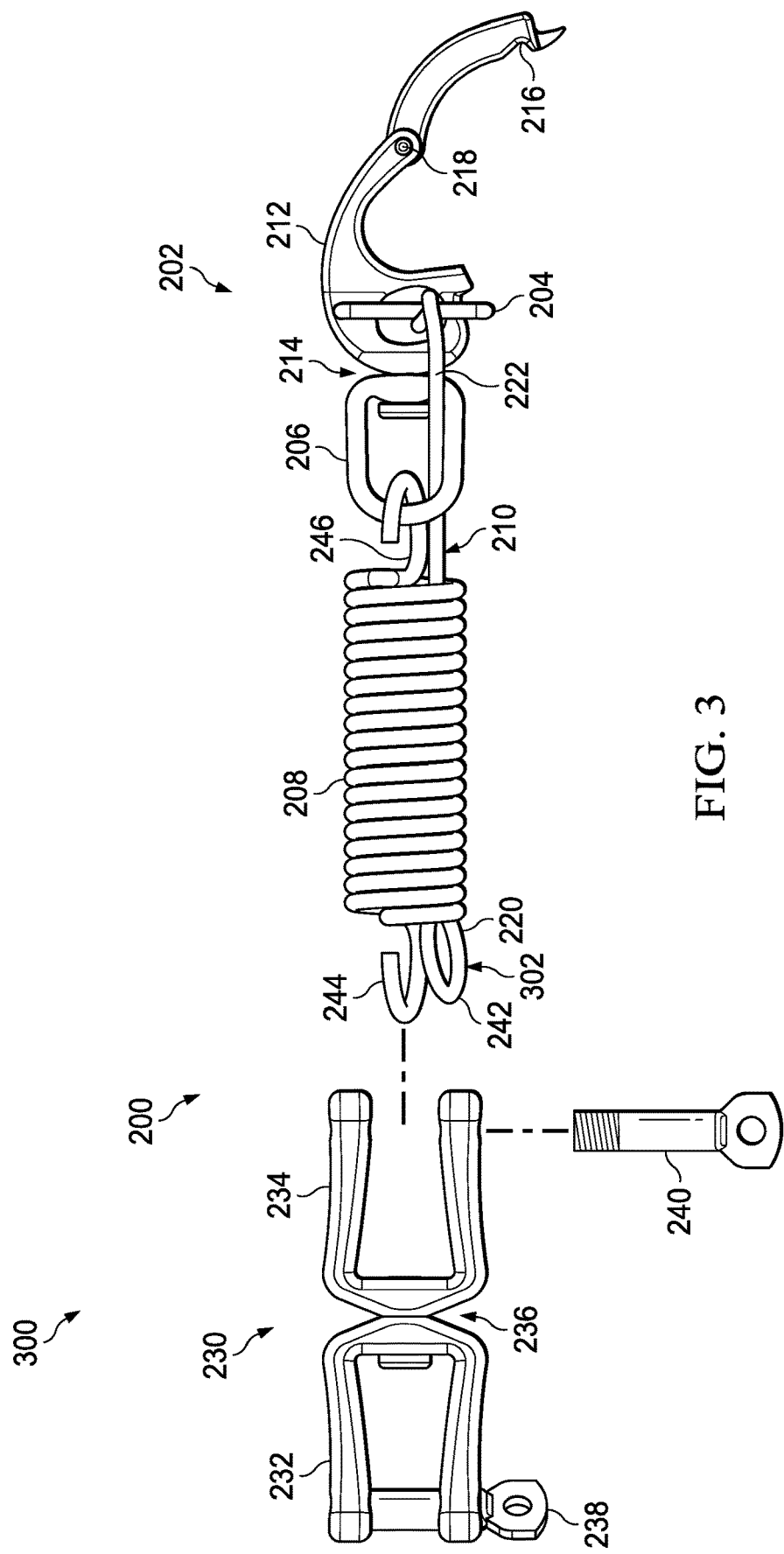
FIG. 3 is an illustration of a partially assembled non-frangible load release assembly in accordance with an illustrative example.

Turning now to FIG. 3, an illustration of a partially assembled non-frangible load release assembly is depicted in accordance with an illustrative example. In view 300 of load release assembly 200, actuating line 210 has been assembled and sent through spring 208. In view 300, loop 228 (not depicted) engages knot 226 (not depicted) to set length 302 of actuating line 210. Length 302 sets a load at which snap shackle 202 will open. Length 302 sets a pre-determined load at which load release assembly 200 releases an object.

Figure 4:
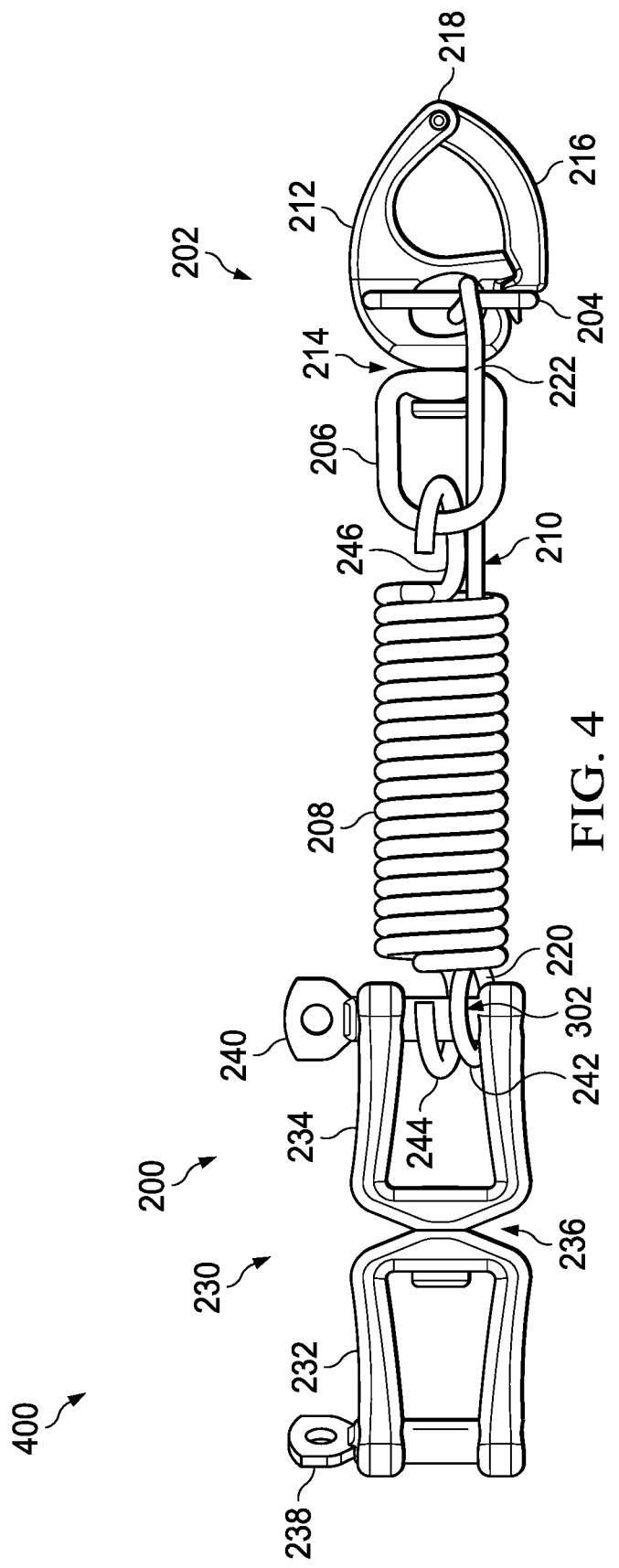
FIG. 4 is an illustration of an assembled non-frangible load release assembly in accordance with an illustrative example.

Turning now to FIG. 4, an illustration of an assembled non-frangible load release assembly is depicted in accordance with an illustrative example. In view 400 of load release assembly 200, pin 240 directly joins spring 208 and actuating line 210 to connector 230.

Snap shackle 202 is positioned on first end 402 of load release assembly 200. Connector 230 is positioned on second end 404 of load release assembly 200.

In use, connector 230 will be connected to an anchor. In use, snap shackle 202 will be connected to an object.

Turning now to FIG. 5, an illustration of a non-frangible load release assembly with a load applied is depicted in accordance with an illustrative example. Load release assembly 500 is a physical implementation of load release assembly 100 of FIG. 1. In some illustrative examples, load release assembly 500 has a same design as load release assembly 200 of FIGS. 2-4. Load release assembly 500 is non-frangible and has a pre-set tension for release.

Load release assembly 500 comprises snap shackle 502 having quick release 504 and link 506, spring 508 having a spring rate, and actuating line 510 with a length selected based on the spring rate to provide the pre-set tension for load release assembly 500. Spring 508 is attached to link 506 of snap shackle 502. Actuating line 510 is connected to quick release 504 of snap shackle 502.

Actuating line 510 extends through spring 508 and is joined to connector 512. Load release assembly 500 has first end 514 and second end 516. Snap shackle 502 is first end 514 of load release assembly 500. Connector 512 is second end 516 of load release assembly 500.

Snap shackle 502 is configured to connect to an object. The object is desirably released by load release assembly 500 at a pre-determined load. Connector 512 is configured to connect to an anchor.

Snap shackle 502 has body 518 connected to link 506 by swivel 520. Hook 522 of snap shackle 502 is pivotally connected to body 518 by hinge 524. Quick release 504 is configured to engage with hook 522 to hold hook 522 in closed position 526.

First end 528 of actuating line 510 is connected to quick release 504. Second end 516 of actuating line 510 is joined to connector 512. When no load is applied to load release assembly 500 at snap shackle 502, slack is present in actuating line 510. When actuating line 510 is placed into tension by a load applied to snap shackle 502 in direction 532.

Actuating line 510 is placed into tension by a load having a predetermined value. Actuating line 510 has a length selected to place actuating line 510 into tension at the predetermined value for the load based on a spring rate of spring 508.

Spring 508 has first end 533 connected to link 506 and second end 534 directly joined to connector 512. When a load is applied to load release assembly 500 in direction 532 at snap shackle 502, snap shackle 502 moves in direction 532. When a load is applied to load release assembly 500 in direction 532 at snap shackle 502, spring 508 extends as first end 533 of spring 508 moves in direction 532. In unloaded state 536, spring 508 has length 538.

In some illustrative examples, actuating line 530 is adjustable. When actuating line 530 is adjustable, a tension adjuster (not depicted) is provided to adjust the length of actuating line 530. When present, the tension adjuster has any desirable implementation. In some illustrative examples, the tension adjuster is one of a knob, a rod, or a knot in actuating line 530.

In some other illustrative examples, actuating line 530 has a set length. In some illustrative examples, actuating line 530 is interchangeable to adjust the pre-set tension of load release assembly 500.

Turning now to FIG. 6, an illustration of a non-frangible load release assembly with a load applied is depicted in accordance with an illustrative example. In view 600, a load has been applied to load release assembly 500 in direction 532. In view 600, spring 508 has been extended. In view 600, spring 508 has length 602 greater than length 538 of FIG. 5. In view 600, actuating line 510 has slack. In view 600, actuating line 510 has not been placed into tension.

Figure 7:
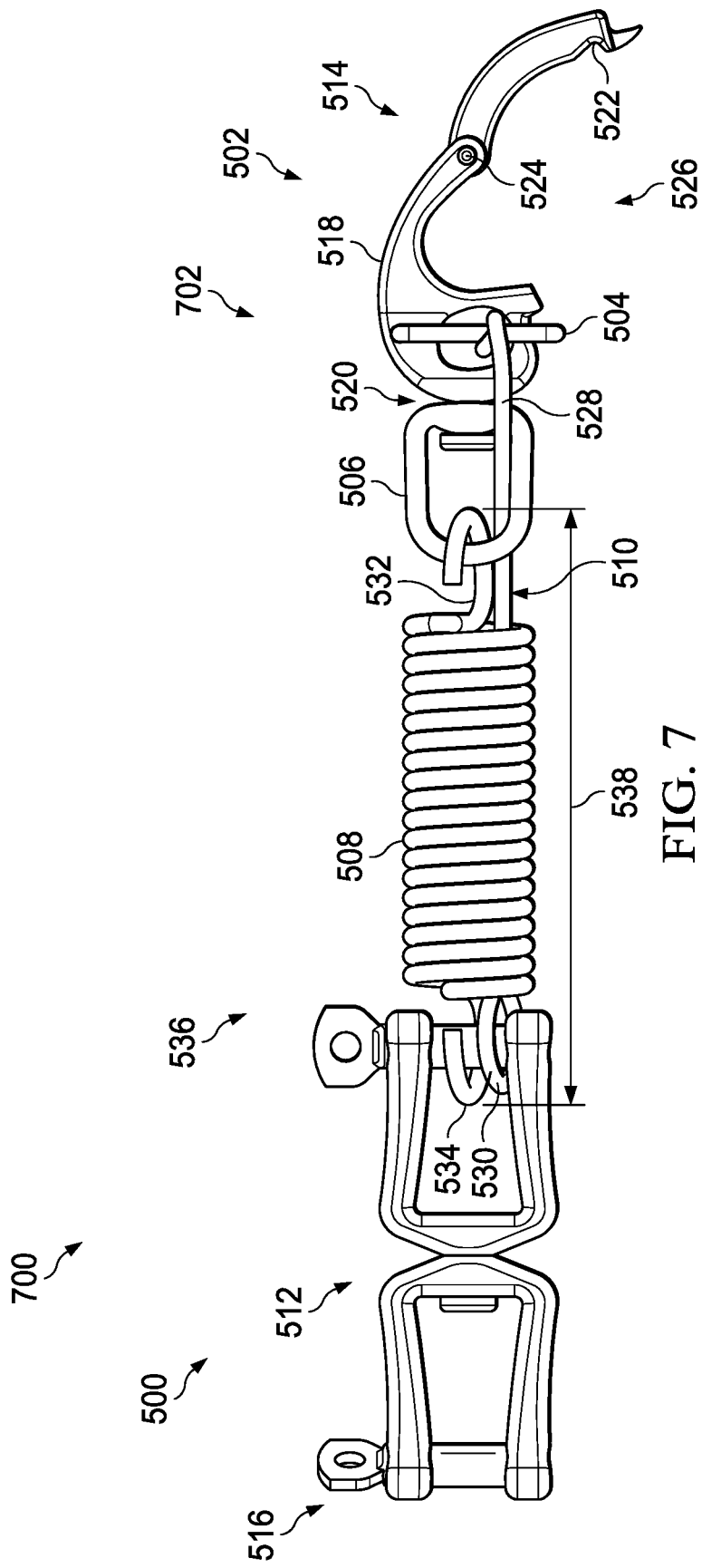
FIG. 7 is an illustration of a non-frangible load release assembly with a snap shackle open in accordance with an illustrative example.

Turning now to FIG. 7, an illustration of a non-frangible load release assembly with a snap shackle open is depicted in accordance with an illustrative example. In view 700, snap shackle 502 is in open position 702. Between view 600 and view 700, spring 508 has been extended until actuating line 510 was placed into tension. When actuating line 510 was placed into tension, actuating line 510 actuated quick release 504. As quick release 504 is actuated, quick release 504 releases hook 522. After hook 522 is released, hook 522 pivots relative to body 518 about hinge 524. Releasing hook 522 places snap shackle 502 in open position.

As actuating line 510 is placed into tension, spring 508 is extended. After releasing hook 522, the load on spring 508 is released. Releasing the load on spring 508 places spring 508 in unloaded state 536. In view 700, spring 508 is in unloaded state 536 and has length 538.

Triggering quick release 504 of snap shackle 502 releases an object while retaining all components of load release assembly 500 within load release assembly 500. Load release assembly 500 can be reset to use load release assembly 500 again. To reset load release assembly 500, snap shackle 502 is closed to hold a second object. Load release assembly 500 can be repeatedly reused for a preset load without replacing components of load release assembly 500.

Figure 8:
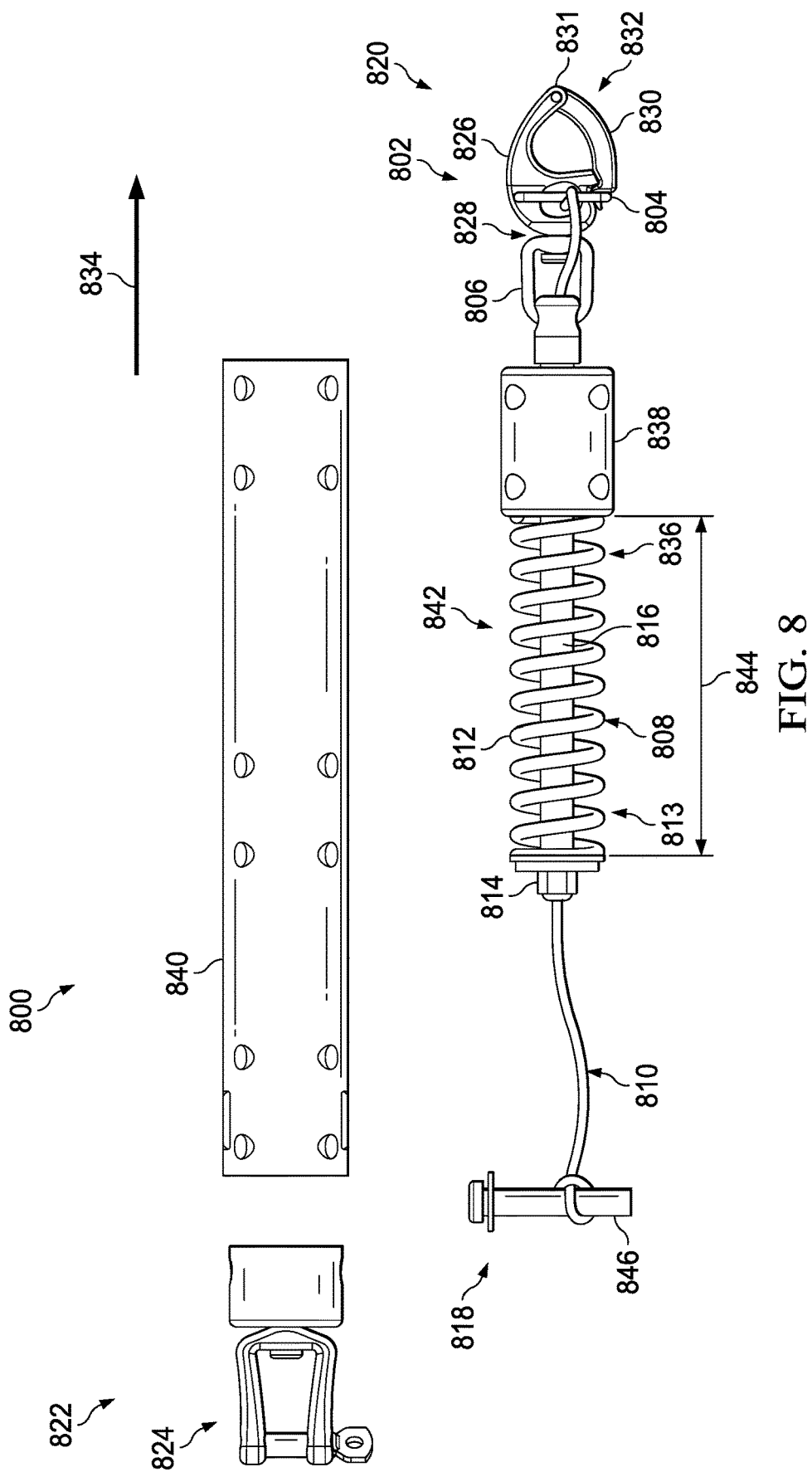
FIG. 8 is an illustration of a partially assembled non-frangible load release assembly in accordance with an illustrative example.

Turning now to FIG. 8, an illustration of a partially assembled non-frangible load release assembly is depicted in accordance with an illustrative example. Load release assembly 800 is a physical implementation of load release assembly 100 of FIG. 1. Load release assembly 800 is non-frangible and has a pre-set tension for release.

Load release assembly 800 comprises snap shackle 802 having quick release 804 and link 806, spring 808 having a spring rate, and actuating line 810 with a length selected based on the spring rate to provide the pre-set tension for load release assembly 800. Spring 808 is attached to link 806 of snap shackle 802. Actuating line 810 is connected to quick release 804 of snap shackle 802.

In this illustrative example, spring 808 takes the form of compression spring 812. Second end 813 of compression spring 812 is associated with lower spring seat 814. In this illustrative example, lower spring seat 814 is connected to link 806 by rod 816 extending through compression spring 812.

In this illustrative example, actuating line 810 extends through spring 808. As depicted, actuating line 810 extends through rod 816. A length of actuating line 810 is adjusted by tension adjuster 818.

Load release assembly 800 has first end 820 and second end 822. Snap shackle 802 is first end 820 of load release assembly 800. Connector 824 is second end 822 of load release assembly 800.

Snap shackle 802 is configured to connect to an object. The object is desirably released by load release assembly 800 at a pre-determined load. Connector 824 is configured to connect to an anchor.

Snap shackle 802 has body 826 connected to link 806 by swivel 828. Hook 830 of snap shackle 802 is pivotally connected to body 826 by hinge 831. Quick release 804 is configured to engage with hook 830 to hold hook 830 in closed position 832.

First end 820 of actuating line 810 is connected to quick release 804. Second end 822 of actuating line 810 is joined to connector 824. When no load is applied to load release assembly 800 at snap shackle 802, slack is present in actuating line 810. When actuating line 810 is placed into tension by a load applied to snap shackle 802 in direction 834.

Actuating line 810 is placed into tension by a load having a predetermined value. Actuating line 810 has a length selected to place actuating line 810 into tension at the predetermined value for the load based on a spring rate of spring 808.

Spring 808 has first end 836 connected to upper spring seat 838. Upper spring seat 838 will be connected to hollow body 840 to restrict movement of first end 836. Rod 816 connected to lower spring seat 814 extends through upper spring seat 838. Rod 816 is connected to link 806 of snap shackle 802. When a load is applied to load release assembly 800 in direction 834 at snap shackle 802, snap shackle 802 moves in direction 834. As snap shackle 802 moves in direction 834, rod 816 moves in direction 834, moving lower spring seat 814 and compressing spring 808. In unloaded state 842, spring 808 has length 844.

In this illustrative example, actuating line 810 is adjustable. Tension adjuster 818 is provided to adjust the length of actuating line 810. Tension adjuster 818 has any desirable implementation. In this illustrative example, tension adjuster 818 comprises rod 846.

Figure 9:
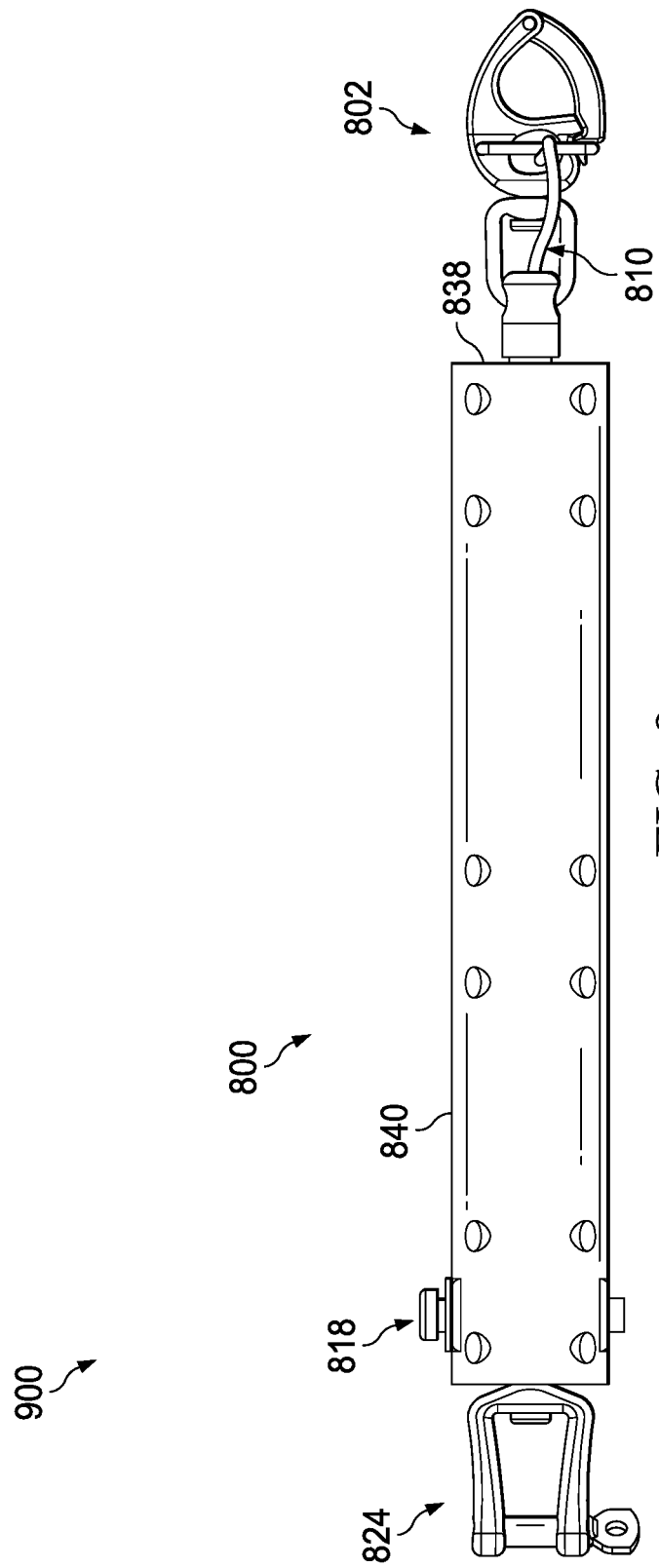
FIG. 9 is an illustration of an assembled non-frangible load release assembly in accordance with an illustrative example.

Turning now to FIG. 9, an illustration of an assembled non-frangible load release assembly is depicted in accordance with an illustrative example. View 900 is an assembled view of load release assembly 800 of FIG. 8. In view 900, hollow body 840 is surrounding the majority of actuating line 810. In view 900, spring 508 is positioned within hollow body 840 and is not visible. In view 900, upper spring seat 838 is affixed to hollow body 840 surrounding spring 808. Upper spring seat 838 is affixed to hollow body 840 to restrict movement of first end 836 (not visible) of spring 808 (not visible).

Turning now to FIG. 10, an illustration of a cross-sectional view of a non-frangible load release assembly with a load applied is depicted in accordance with an illustrative example. View 1000 is a cross-sectional view of load release assembly 800 of FIG. 8 in an assembled state. View 1000 is a cross-sectional view through hollow body 840 in FIG. 9.

In view 1000, hollow body 840 is surrounding the majority of actuating line 810. In view 1000, spring 808 is positioned within hollow body 840. In view 1000, load release assembly 800 is not under a load.

In view 1000, upper spring seat 838 is affixed to hollow body 840 to restrain upper spring seat 838, while lower spring seat 814 will move as load is applied to snap shackle 802. In view 1000, spring 808 has length 844.

Turning now to FIG. 11, an illustration of a cross-sectional view of a non-frangible load release assembly with a load applied is depicted in accordance with an illustrative example. In view 1100, a load has been applied to load release assembly 800 in direction 834. In view 1100, snap shackle 802 has moved in direction 834. Snap shackle 802 moving in direction 834 has moved rod 816 and lower spring seat 814 in direction 834. Lower spring seat 814 moving in direction 834 has compressed spring 808. In view 1100, spring 808 has been compressed. In view 1100, spring 808 has length 1102 less than length 844 of FIG. 8. In view 1100, actuating line 810 has slack. In view 1100, actuating line 810 has not been placed into tension.

Figure 12:
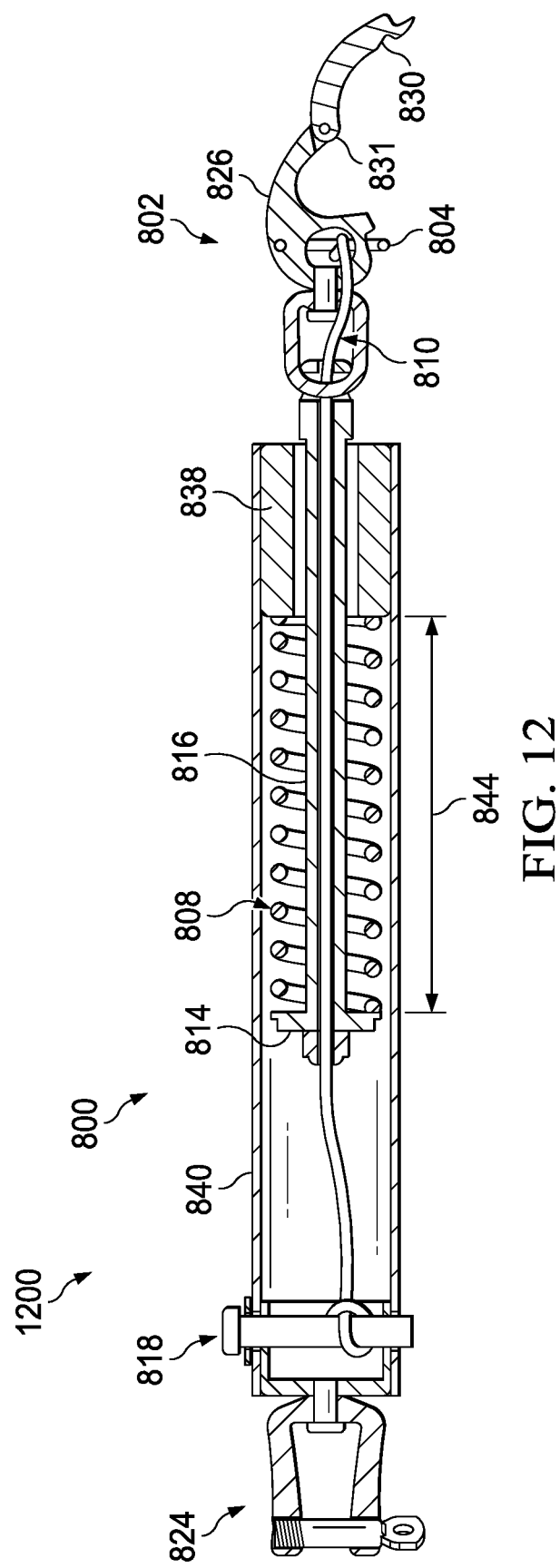
FIG. 12 is an illustration of a cross-sectional view of a non-frangible load release assembly with a snap shackle open in accordance with an illustrative example.

Turning now to FIG. 12, an illustration of a cross-sectional view of a non-frangible load release assembly with a snap shackle open is depicted in accordance with an illustrative example. In view 1200, snap shackle 802 is in open position 1202. Between view 1100 and view 1200, spring 808 has been compressed until actuating line 810 was placed into tension. When actuating line 810 was placed into tension, actuating line 810 actuated quick release 804. As quick release 804 is actuated, quick release 804 releases hook 830. After hook 830 is released, hook 830 pivots relative to body 826 about hinge 831. Releasing hook 830 places snap shackle 802 in open position.

As actuating line 810 is placed into tension, spring 808 is compressed. After releasing hook 830, the load on spring 808 is released. Releasing the load on spring 808 places spring 808 in an unloaded state. In view 1200, spring 808 is in an unloaded state and has length 844.

Triggering quick release 804 of snap shackle 802 releases an object while retaining all components of load release assembly 800 within load release assembly 800. Load release assembly 800 can be reset to use load release assembly 800 again. To reset load release assembly 800, snap shackle 802 is closed to hold a second object. Load release assembly 800 can be repeatedly reused for a preset load without replacing components of load release assembly 800.

Figure 13:
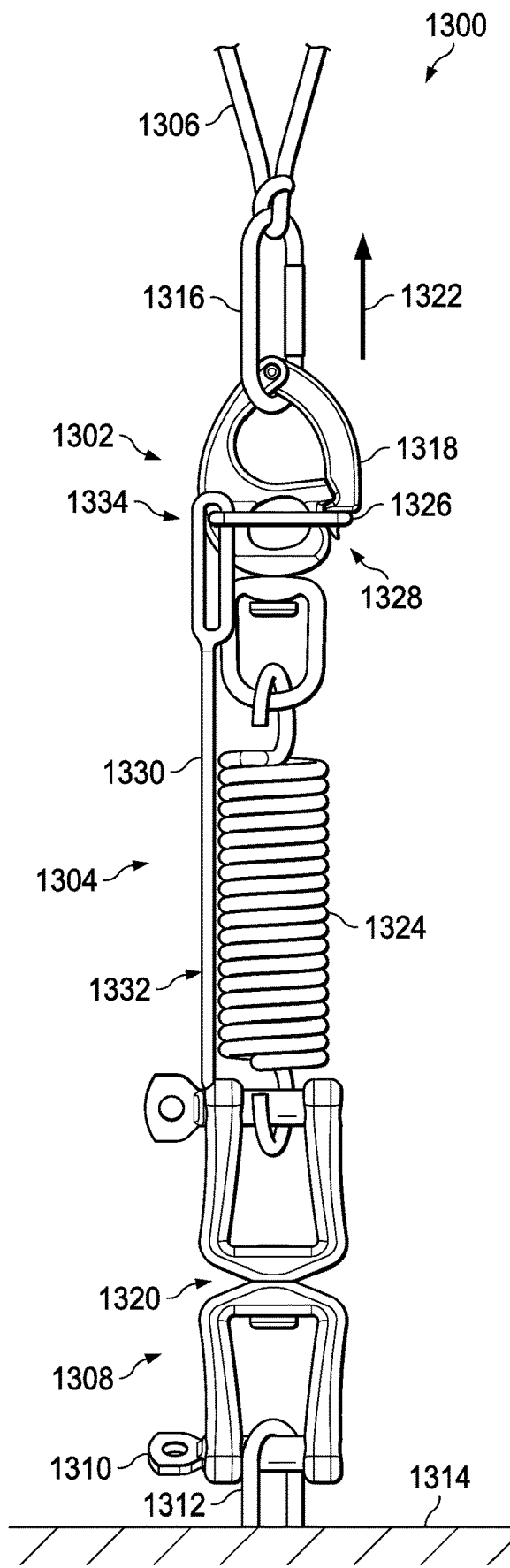
FIG. 13 is an illustration of a non-frangible load release assembly connected to an object and an anchor in accordance with an illustrative example.

Turning now to FIG. 13, an illustration of a non-frangible load release assembly connected to an object and an anchor is depicted in accordance with an illustrative example. In view 1300, first end 1302 of load release assembly 1304 is connected to object 1306 and second end 1308 of load release assembly 1304 is connected to anchor 1310. In this illustrative example, anchor 1310 is bracket 1312 connected to ground 1314. In this illustrative example, object 1306 includes ring 1316.

First end 1302 takes the form of snap shackle 1318. Second end 1308 takes the form of connector 1320. Ring 1316 is held within snap shackle 1318 in view 1300. Connector 1320 is connected to bracket 1312.

In view 1300, object 1306 applies a load in direction 1322 to load release assembly 1304. As load is applied in direction 1322, snap shackle 1318 moves in direction 1322. As load is applied in direction 1322, spring 1324 of load release assembly 1304 is extended. Spring 1324 is directly joined to connector 1320.

As snap shackle 1318 moves in direction 1322, quick release 1326 moves within channel 1328 of actuating line 1330. In this illustrative example, actuating line 1330 is rigid component 1332 with channel 1328. When quick release 1326 reaches end 1334 of channel 1328, quick release 1326 is actuated.

Figure 14:
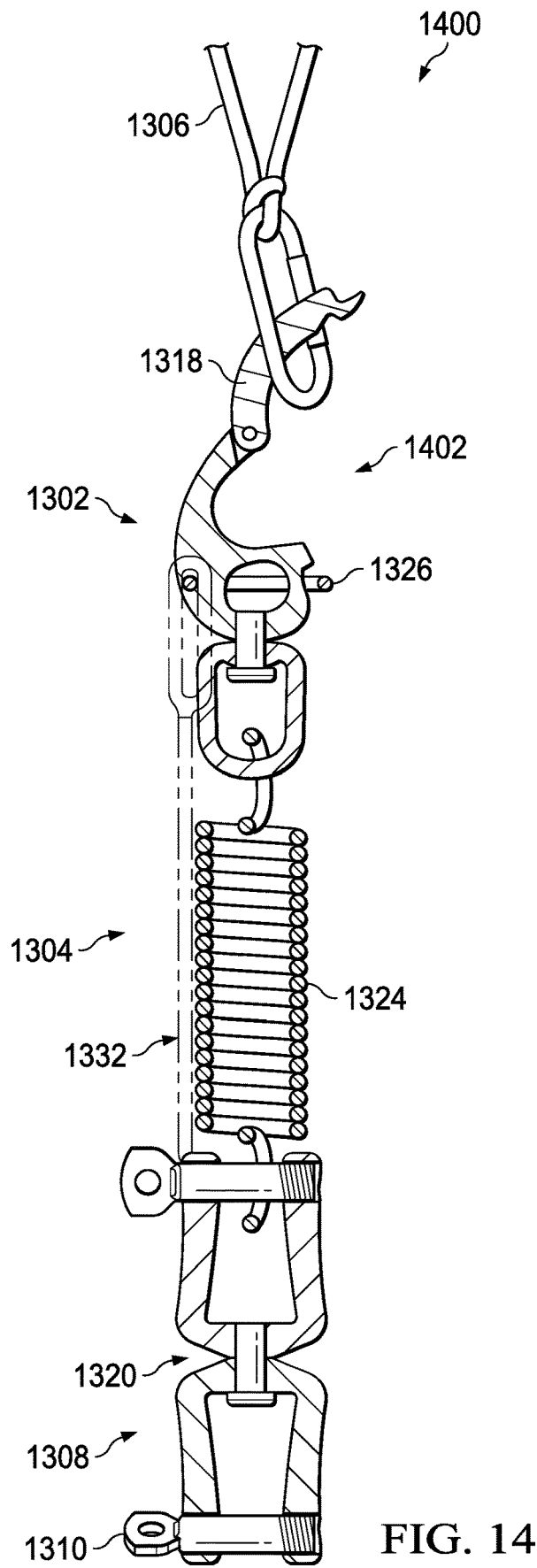
FIG. 14 is an illustration of a non-frangible load release assembly connected to an anchor after releasing an object in accordance with an illustrative example.

Turning now to FIG. 14, an illustration of a non-frangible load release assembly connected to an anchor after releasing an object is depicted in accordance with an illustrative example. In view 1400, load release assembly 1304 has released object 1306. In view 1400, snap shackle 1318 is in open position 1402.

Triggering quick release 1326 of snap shackle 1318 releases object 1306 while retaining all components of load release assembly 1304 within load release assembly 1304. Load release assembly 1304 can be reset to use load release assembly 1304 again. To reset load release assembly 1304, snap shackle 1318 is closed to hold a second object. Load release assembly 1304 can be repeatedly reused for a preset load without replacing components of load release assembly 1304.

Figure 15:
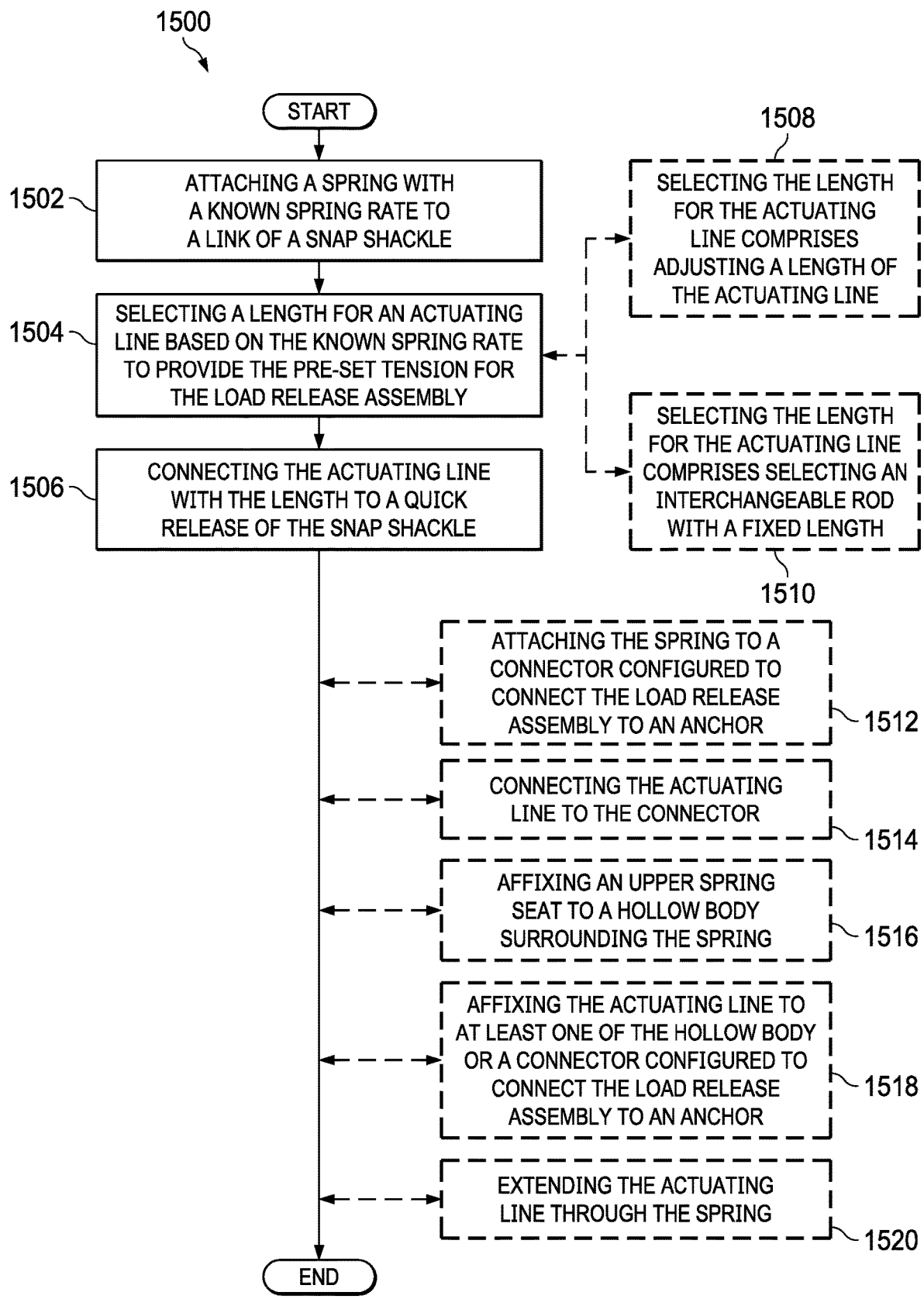
FIG. 15 is an illustration of a flowchart of a method of assembling a non-frangible load release assembly having a pre-set tension for release in accordance with an illustrative example.

Turning now to FIG. 15, an illustration of a flowchart of a method of assembling a non-frangible load release assembly having a pre-set tension for release is depicted in accordance with an illustrative example. Method 1500 can be used to assemble load release assembly 100 of FIG. 1. Method 1500 can be used to assemble load release assembly 200 of FIGS. 2-4. Method 1500 can be used to assemble load release assembly 500 of FIGS. 5-7. Method 1500 can be used to assemble load release assembly 800 of FIGS. 8-12. Method 1500 can be used to assemble load release assembly 1304 of FIGS. 13-14.

Method 1500 attaches a spring with a spring rate to a link of a snap shackle (operation 1502). The spring is connected to the snap shackle either directly or indirectly. When the spring is connected directly, the spring takes the form of an extension spring. When a spring is indirectly connected to a snap shackle, the spring can be either an extension spring or a compression spring.

Method 1500 selects a length for an actuating line based on the spring rate to provide the pre-set tension for the load release assembly (operation 1504). Method 1500 connects the actuating line with the length to a quick release of the snap shackle (operation 1506). Afterwards, the method terminates.

In some illustrative examples, selecting the length for the actuating line comprises adjusting a length of the actuating line (operation 1508). When actuating line is adjustable, the same actuating line can be used to provide a range of discrete pre-set tensions. In some illustrative examples, selecting the length for the actuating line comprises selecting an interchangeable actuating line with a fixed length (operation 1510). When the actuating line is interchangeable, the actuating line can be removed and replaced with a different actuating line having a different length to change the pre-set tension.

In some illustrative examples, method 1500 attaches the spring to a connector configured to connect the load release assembly to an anchor (operation 1512).

In some illustrative examples, method 1500 connects the actuating line to the connector (operation 1514).

In some illustrative examples, method 1500 affixes an upper spring seat to a hollow body surrounding the spring (operation 1516). By affixing the upper spring seat to the hollow body, the spring of the load release assembly can be a compression spring.

In some illustrative examples, method 1500 affixes the actuating line to at least one of the hollow body or a connector configured to connect the load release assembly to an anchor (operation 1518). In some illustrative examples, method 1500 extends the actuating line through the spring (operation 1520). In some illustrative examples, when the actuating line extends through the spring, the actuating line is coaxial with the spring.

Figure 16:
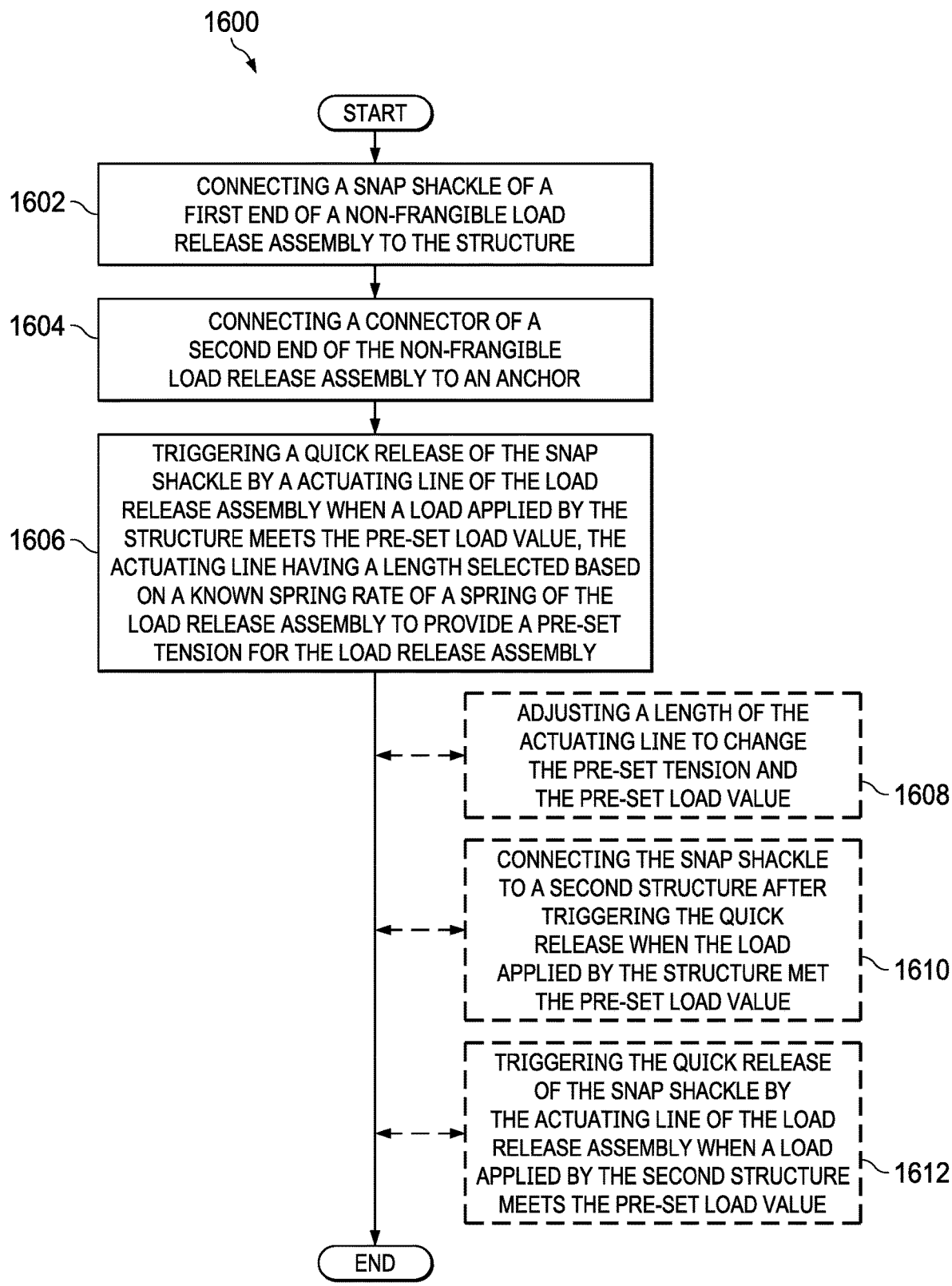
FIG. 16 is an illustration of a flowchart of a method of releasing an object at a pre-set load value in accordance with an illustrative example.

Turning now to FIG. 16, an illustration of a flowchart of a method of releasing an object at a pre-set load value is depicted in accordance with an illustrative example. Method 1600 can be performed using load release assembly 100 of FIG. 1. Method 1600 can be performed using load release assembly 200 of FIGS. 2-4. Method 1600 can be performed using load release assembly 500 of FIGS. 5-7. Method 1600 can be performed using load release assembly 800 of FIGS. 8-12. Method 1600 can be performed using load release assembly 1304 of FIGS. 13-14.

Method 1600 connects a snap shackle of a first end of a non-frangible load release assembly to the object (operation 1602). Method 1600 connects a connector of a second end of the non-frangible load release assembly to an anchor (operation 1604). Method 1600 triggers a quick release of the snap shackle by a actuating line of the load release assembly when a load applied by the object meets the pre-set load value, the actuating line having a length selected based on a spring rate of a spring of the load release assembly to provide a pre-set tension for the load release assembly (operation 1606). Afterwards, method 1600 terminates.

In some illustrative examples, method 1600 adjusts a length of the actuating line to change the pre-set tension and the pre-set load value (operation 1608). In these illustrative examples, the length of the actuating line can be adjusted in any desirable fashion. In some illustrative examples, actuating line is a flexible material that is wound around a component to adjust the length of the actuating line.

In some illustrative examples, method 1600 connects the snap shackle to a second object after triggering the quick release when the load applied by the object met the pre-set load value (operation 1610). In some illustrative examples, method 1600 triggers the quick release of the snap shackle by the actuating line of the load release assembly when a load applied by the second object meets the pre-set load value (operation 1612).

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

The flowcharts and block diagrams in the different depicted examples illustrate the architecture, functionality, and operation of some possible implementations of apparatuses and methods in an illustrative example. In this regard, each block in the flowcharts or block diagrams may represent at least one of a module, a segment, a function, or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, any of operations 1508 through 1520 may be optional. As another example, any of operations 1608 through 1612 may be optional.

As used herein, "a number of," when used with reference to items, means one or more items. For example, a number of lengths is one or more lengths.

A load release assembly of the illustrative examples will release a load with a pre-set value without using a frangible connector. The load release assembly provides a reusable system for releasing loads without requiring replacement parts.

A latch, in the form of a snap shackle, is coupled, directly or indirectly, to a spring and an actuating line. A load applied to the load release assembly causes expansion or compression of the spring. The amount of expansion or compression of the spring corresponds to the magnitude of the load. The actuating line is sized to open the latch when the expansion or compression of the spring reaches a length corresponding to a predetermined load amount. Some illustrative examples include an adjustment knob to select/vary the load at which the mechanism will release.

The load release assembly is more consistent and repeatable than conventional frangible components. The load release assembly releases the load without a portion of the load release assembly staying attached to the object providing the load.

The load release assembly is fully adjustable by selecting a type of spring, a spring rate, and a length of an actuating line. By selecting characteristics of the spring and actuating line, the load release assembly can be set to release a load at a desired pre-set load value.

The load release assembly does not require replacement pieces after each use. The load release assembly can be repeatedly reused to release a load having the same pre-set value. In some illustrative examples, the load release assembly is adjusted by replacing or adjusting the length of the actuating line to change the pre-set tension between uses.

The load release assembly will hold back an increasing or variable load to a predetermined tension and will completely release that load once the pre-set tension is met. The load release mechanism is a reliable, precise, and re-usable load release mechanism. Expansion or compression of a spring causes an actuating line to pull open a latch at a predetermined level of expansion or compression, corresponding to a predetermined load level on the spring.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

Clause 1: A load release assembly comprising a snap shackle having a quick release and a link; a spring having a spring rate, the spring attached to the link of the snap shackle; and an actuating line with a length selected based on the spring rate to provide a pre-set tension for the load release assembly, the actuating line connected to the quick release of the snap shackle. Clause 2: The load release assembly of Clause 1, wherein the spring is a tension spring. Clause 3: The load release assembly of Clause 1 or 2, wherein the length of the actuating line is adjustable. Clause 4: The load release assembly of any of Clauses 1-3, wherein the actuating line is interchangeable. Clause 5: The load release assembly of any of Clauses 1-4 further comprising a connector configured to connect the load release assembly to an anchor, wherein the actuating line and the spring are joined to the connector. Clause 6: The load release assembly of Clause 5 further comprising a hollow body surrounding the spring, wherein the actuating line and the spring are indirectly joined to the connector through the hollow body. Clause 7: The load release assembly of any of Clauses 1-6 further comprising a tension adjuster configured to change the length of the actuating line to adjust the pre-set tension. Clause 8: The load release assembly of any of Clauses 1-7 wherein the actuating line extends through the spring. Clause 9: The load release assembly of any of Clauses 1-8 further comprising a connector configured to connect the load release assembly to an anchor, wherein the snap shackle is a first end of the load release assembly and the connector is a second end of the load release assembly. Clause 10: The load release assembly of any of Clause 9 further comprising a hollow body between the connector and the snap shackle.

Clause 11: A method of assembling a non-frangible load release assembly having a pre-set tension for release, the method comprising attaching a spring with a spring rate to a link of a snap shackle; selecting a length for an actuating line based on the spring rate to provide the pre-set tension for the load release assembly; and connecting the actuating line with the length to a quick release of the snap shackle. Clause 12: The method of Clause 11 further comprising attaching the spring to a connector configured to connect the load release assembly to an anchor; and connecting the actuating line to the connector. Clause 13: The method of Clause 11 or 12 further comprising affixing an upper spring seat to a hollow body surrounding the spring.

Clause 14: The method of Clause 13 further comprising affixing the actuating line to at least one of the hollow body or a connector configured to connect the load release assembly to an anchor. Clause 15: The method of any of Clauses 11-14 wherein selecting the length for the actuating line comprises adjusting a length of the actuating line. Clause 16: The method of any of Clauses 11-15 wherein selecting the length for the actuating line comprises selecting an interchangeable actuating line with a fixed length. Clause 17: The method of any of Clauses 11-16 further comprising extending the actuating line through the spring. Clause 18: A method of releasing an object at a pre-set load value, the method comprising connecting a snap shackle of a first end of a non-frangible load release assembly to the object; connecting a connector of a second end of the non-frangible load release assembly to an anchor; and triggering a quick release of the snap shackle by a actuating line of the load release assembly when a load applied by the object meets the pre-set load value, the actuating line having a length selected based on a spring rate of a spring of the load release assembly to provide a pre-set tension for the load release assembly. Clause 19: The method of Clause 18 further comprising adjusting a length of the actuating line to change the pre-set tension and the pre-set load value. Clause 20: The method of Clause 18 or 19 further comprising connecting the snap shackle to a second object after triggering the quick release when the load applied by the object met the pre-set load value; and triggering the quick release of the snap shackle by the actuating line of the load release assembly when a load applied by the second object meets the pre-set load value. Clause 21: The method of any of Clauses 18-20, wherein triggering a quick release of the snap shackle releases the object while retaining all components of the load release assembly within the load release assembly.

What is claimed is:

1. A load release assembly, comprising:
   a snap shackle having a quick release and a link;
   a spring having a spring rate, a first end of the spring attached to the link of the snap shackle;
   an actuating line with a length selected based on the spring rate to provide a pre-set tension for the load release assembly, a first end of the actuating line connected to the quick release of the snap shackle; and a connector configured to connect the load release assembly to an anchor, wherein a second end of the actuating line and a second end of the spring are connected to the connector.

2. The load release assembly of claim 1, wherein the spring is a tension spring.

3. The load release assembly of claim 1, wherein the length of the actuating line is adjustable.

4. The load release assembly of claim 1, wherein the actuating line is interchangeable.

5. The load release assembly of claim 1 further comprising:
a hollow body surrounding the spring, wherein the actuating line and the spring are indirectly joined to the connector through the hollow body.

6. The load release assembly of claim 1 further comprising:
a tension adjuster configured to change the length of the actuating line to adjust the pre-set tension.

7. The load release assembly of claim 1, wherein the actuating line extends through the spring.

8. The load release assembly of claim 1,
wherein the snap shackle is a first end of the load release assembly and the connector is a second end of the load release assembly.

9. The load release assembly of claim 8 further comprising:
a hollow body between the connector and the snap shackle.

10. A method of assembling a non-frangible load release assembly having a pre-set tension for release, the method comprising:
attaching a first end of a spring with a spring rate to a link of a snap shackle;
selecting a length for an actuating line based on the spring rate to provide the pre-set tension for the load release assembly;
connecting a first end of the actuating line to a quick release of the snap shackle;
attaching a second end of the spring to a connector configured to connect the load release assembly to an anchor; and
connecting a second end of the actuating line to the connector.

11. The method of claim 10 further comprising:
affixing an upper spring seat to a hollow body surrounding the spring.

12. The method of claim 11 further comprising:
affixing the actuating line to the hollow body.

13. The method of claim 10, wherein selecting the length for the actuating line comprises adjusting the length of the actuating line.

14. The method of claim 10, wherein selecting the length for the actuating line comprises selecting an interchangeable actuating line with a fixed length.

15. The method of claim 10 further comprising:
extending the actuating line through the spring.

16. A method of releasing an object at a pre-set load value, the method comprising:
connecting a snap shackle of a first end of a non-frangible load release assembly to the object comprising attaching a first end of a spring to the snap shackle and connecting a first end of an actuating line to the snap shackle;
connecting a connector of a second end of the non-frangible load release assembly to an anchor comprising attaching a second end of the spring to the connector and connecting a second end of the actuating line to the connector; and
triggering a quick release of the snap shackle by the actuating line of the load release assembly when a load applied by the object meets the pre-set load value, the actuating line having a length selected based on a spring rate of a spring of the load release assembly to provide a pre-set tension for the load release assembly.

17. The method of claim 16 further comprising:
adjusting the length of the actuating line to change the pre-set tension and the pre-set load value.

18. The method of claim 16 further comprising:
connecting the snap shackle to a second object after triggering the quick release when the load applied by the object met the pre-set load value; and
triggering the quick release of the snap shackle by the actuating line of the load release assembly when a load applied by the second object meets the pre-set load value.

19. The method of claim 16, further comprising:
selecting an interchangeable actuating line with a fixed length to change the pre-set tension and pre-set load value.

20. The method of claim 16 further comprising:
affixing an upper spring seat to a hollow body surrounding the spring.

21. The method of claim 20 further comprising:
affixing the actuating line to the hollow body.

* * * * *